US008786576B2

(12) United States Patent
Jung et al.

(10) Patent No.: US 8,786,576 B2

(45) Date of Patent: Jul. 22, 2014

(54) THREE-DIMENSIONAL SPACE TOUCH APPARATUS USING MULTIPLE INFRARED CAMERAS

(75) Inventors: Kwang Mo Jung, Gyeonggi-do (KR); Young Choong Park, Seoul (KR); Kwang Soon Choi, Gyeonggi-do (KR); Woo Chul Park, Incheon (KR); Hae Moon Seo, Gyeonggi-do (KR); Yang Keun Ahn, Seoul (KR)

(73) Assignee: Korea Electronics Technology Institute, Seongnam-si (KR)

(*) Notice: Subject to any disclaimer, the term of this patent is extended or adjusted under 35 U.S.C. 154(b) by 184 days.

(21) Appl. No.: 12/975,176

(22) Filed: Dec. 21, 2010

(65) Prior Publication Data

US 2011/0148822 A1 Jun. 23, 2011

(30) Foreign Application Priority Data

Dec. 22, 2009 (KR) ........................ 10-2009-0128602

(51) Int. Cl.
*G06F 3/042* (2006.01)

(52) U.S. Cl.
USPC .......................................................... 345/175

(58) Field of Classification Search
USPC .......................................................... 345/175
See application file for complete search history.

(56) References Cited

U.S. PATENT DOCUMENTS 5,059,959 A * 10/1991 Barry ............................ 345/168
5,454,043 A * 9/1995 Freeman ....................... 382/168
6,100,538 A * 8/2000 Ogawa ..................... 250/559.29
6,130,663 A * 10/2000 Null ............................. 345/158
7,317,812 B1 * 1/2008 Krahnstoever et al. ........ 382/103
7,421,093 B2 9/2008 Hildreth et al.
8,169,404 B1 * 5/2012 Boillot .......................... 345/158
2002/0036617 A1 * 3/2002 Pryor ............................ 345/156
2002/0041327 A1 * 4/2002 Hildreth et al. ................. 348/42
2002/0060665 A1 * 5/2002 Sekiguchi et al. ............ 345/157

(Continued)

FOREIGN PATENT DOCUMENTS

KR 100804815 B1 12/2008
KR 1020090116544 A 11/2009

OTHER PUBLICATIONS

"Laser Harp," 5 pages, Creative Commons Attribution-Share Alike 3.0 Unported, Article Sources and Contributors http://en.wikipedia.org/wiki/Laser_harp.

(Continued)

*Primary Examiner* — Claire X Pappas
*Assistant Examiner* — Robert Stone
(74) *Attorney, Agent, or Firm* — Sughrue Mion, PLLC

(57) ABSTRACT

Disclosed herein is a 3D space touch apparatus. The 3D space touch apparatus includes a support, an infrared LED array, left and right infrared cameras, and a space touch sensor module. The support supports the infrared LED array and the left and right infrared cameras. The infrared LED array emits infrared rays, which form an infrared screen in a space above the support. The left and right infrared cameras are disposed on the left and right sides of the support so that the lenses thereof can be oriented to the infrared screen. The space touch sensor module calculates the X-, Y- and Z-axis coordinates of a location of the infrared screen, touched by user pointing means, using images captured by the left and right infrared cameras and information about the resolutions and angles of view of the left and right infrared cameras.

19 Claims, 5 Drawing Sheets

X AXIS OF SPACE TOUCH COORDINATE SYSTEM
SENSING AREA
X AXIS OF CAMERA
Y AXIS OF CAMERA
120
140
130
XY ARRANGEMENT ON CAMERA
110
INFRARED LED ARRAY
Y AXIS OF SPACE TOUCH COORDINATE SYSTEM
LEFT INFRARED CAMERA
RIGHT INFRARED CAMERA

(56) References Cited

U.S. PATENT DOCUMENTS

| | | | | |
|---|---|---|---|---|
| 2002/0075240 | A1 * | 6/2002 | Lieberman et al. | 345/170 |
| 2005/0105772 | A1 * | 5/2005 | Voronka et al. | 382/103 |
| 2005/0184967 | A1 * | 8/2005 | Yoshida et al. | 345/173 |
| 2006/0044282 | A1 * | 3/2006 | Pinhanez et al. | 345/173 |
| 2006/0098873 | A1 * | 5/2006 | Hildreth et al. | 382/181 |
| 2006/0139314 | A1 * | 6/2006 | Bell | 345/156 |
| 2006/0232792 | A1 * | 10/2006 | Kobayashi | 356/621 |
| 2007/0125633 | A1 * | 6/2007 | Boillot | 200/52 R |
| 2007/0132721 | A1 * | 6/2007 | Glomski et al. | 345/156 |
| 2008/0013793 | A1 * | 1/2008 | Hillis et al. | 382/114 |
| 2008/0013826 | A1 * | 1/2008 | Hillis et al. | 382/154 |
| 2008/0055247 | A1 * | 3/2008 | Boillot | 345/158 |
| 2008/0111797 | A1 * | 5/2008 | Lee | 345/175 |
| 2008/0134102 | A1 * | 6/2008 | Movold et al. | 715/863 |
| 2008/0244468 | A1 * | 10/2008 | Nishihara et al. | 715/863 |
| 2009/0189858 | A1 * | 7/2009 | Lev et al. | 345/158 |
| 2010/0231522 | A1 * | 9/2010 | Li | 345/169 |
| 2010/0234094 | A1 * | 9/2010 | Gagner et al. | 463/20 |
| 2011/0080490 | A1 * | 4/2011 | Clarkson et al. | 348/222.1 |
| 2011/0296353 | A1 * | 12/2011 | Ahmed et al. | 715/848 |

OTHER PUBLICATIONS

Steve Hobley, Apr. 2010, "The Laser Harp Pages," 11 pages, http://www.stephenhobley.com/blog/laser-harp-2009/the-laser-harp-pages/.

Korean Office Action issued in corresponding Korean Patent Application No. 10-2009-0128602 dated Jul. 29, 2010.

Notice of Allowance issued in corresponding Korean Patent Application No. 10-2009-0128602 dated Apr. 2, 2010.

* cited by examiner

THREE-DIMENSIONAL SPACE TOUCH APPARATUS USING MULTIPLE INFRARED CAMERAS

PRIORITY

This patent application claims priority from patent application no. 10-2009-0128602, filed in the Republic of Korea on Dec. 22, 2009, and naming Kwang Mo Jung, Young Choong Park, Kwang Soon Choi, Woo Chul Park, Hae Moon Seo, and Yang Keun Ahn as inventors, the disclosure of which is incorporated herein, in its entirety, by reference.

TECHNICAL FIELD

The present invention relates generally to a three-dimensional (3D) space touch apparatus using multiple infrared cameras, and, more particularly, to a 3D space touch apparatus which includes infrared Light-Emitting Diodes (LEDs) and multiple infrared cameras and, thereby, can implement a virtual 3D touch screen in a free space.

BACKGROUND ART

Recently, touch screens have been widely used in place of keyboards, and are configured to enable input to be directly made on a screen so that when a person's finger or an object touches a character or a specific location on the screen, the location of the touch can be sensed and then specific processing can be performed using installed software.

Such touch screens can display characters or picture information corresponding to functions in various manners, thus allowing users to easily perceive the functions. For this reason, touch screens have been applied to and variously used for devices for guidance, Point-Of-Sales (POS) terminals for stores, devices for typical business purposes, etc. in various places such as subway stations, department stores, and banks.

A conventional touch screen is configured such that a touch panel is attached to the screen of a monitor and, when a fingertip or an object touches a predetermined region, the generation of user input is sensed by sensing the variation in the characteristics of the region.

FIG. 1 is a diagram showing the construction of a conventional touch screen apparatus.

As shown in FIG. 1, the conventional touch screen apparatus is formed by attaching a touch panel to the screen of a typical monitor, and operates such that when a fingertip or an object touches a predetermined region, user input is sensed by sensing the variation in the characteristics of the predetermined region.

The entire conventional touch screen is divided into two-dimensional (2D) grids and analyzes the location of a touch, and is based on an interface scheme in which touches are sensed using capacitance, ultrasonic waves, infrared rays, a resistive film, sound wave recognition, or the like.

That is, since the conventional touch screen is configured in a 2D form in which a display screen and a touch panel are arranged on the same plane, it is impossible to implement a virtual 3D touch screen scheme which enables a free space away from a display to be touched.

SUMMARY OF EMBODIMENTS

Accordingly, the present invention has been made keeping in mind the above problems occurring in the prior art, and an object of the present invention is to provide a 3D space touch apparatus using multiple cameras, which can sense the location of a touch made by a user in a free space away from a display device and which can process the command of the user based on the sensed location.

In order to accomplish the above object, the present invention provides a 3D space touch apparatus, including a support for supporting an infrared LED array and left and right infrared cameras; the infrared LED array for emitting infrared rays and then forming an infrared screen in a space above the support; the left and right infrared cameras disposed on the left and right sides of the support so that the lenses thereof can be oriented to the infrared screen; and a space touch sensor module for calculating the X-, Y- and Z-axis coordinates of a location of the infrared screen, touched by user pointing means, using images captured by the left and right infrared cameras and information about the resolutions and angles of view of the left and right infrared cameras.

The space touch sensor module may calculate the Z-axis coordinate of the location of the infrared screen using a vertical-axis coordinate of locations of the camera images touched by the user pointing means, and calculate the X-axis and Y-axis coordinates of the locations of the infrared screen using lateral-axis coordinates of the locations of the camera images touched by the user pointing means and the information about resolutions and angles of view of the left and right infrared cameras.

The 3D space touch apparatus may further include a pulse generation unit for periodically generating a pulse signal; and an LED driver unit for supplying DC power to the infrared LED array when the pulse signal is input from the pulse generation unit, and interrupting supply of the DC power to the infrared LED array when the pulse signal is not input from the pulse generation unit.

The left and right infrared cameras may perform capturing when the pulse signal is input from the pulse generation unit.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF SPECIFIC EMBODIMENTS

Figure 1:
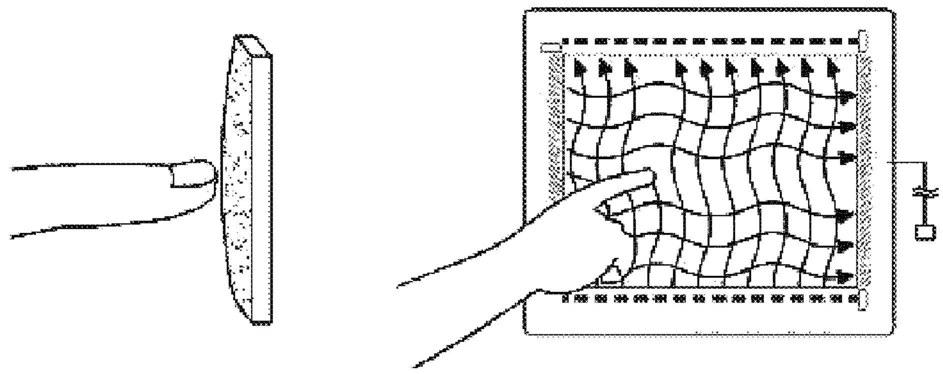
FIG. 1 is a diagram showing the construction of a conventional touch screen apparatus.

Reference now should be made to the drawings, in which the same reference numerals are used throughout the different drawings to designate the same or similar components.

A 3D space touch apparatus according to preferred embodiments of the present invention will be described in detail below with reference to the accompanying drawings.

Figure 2:
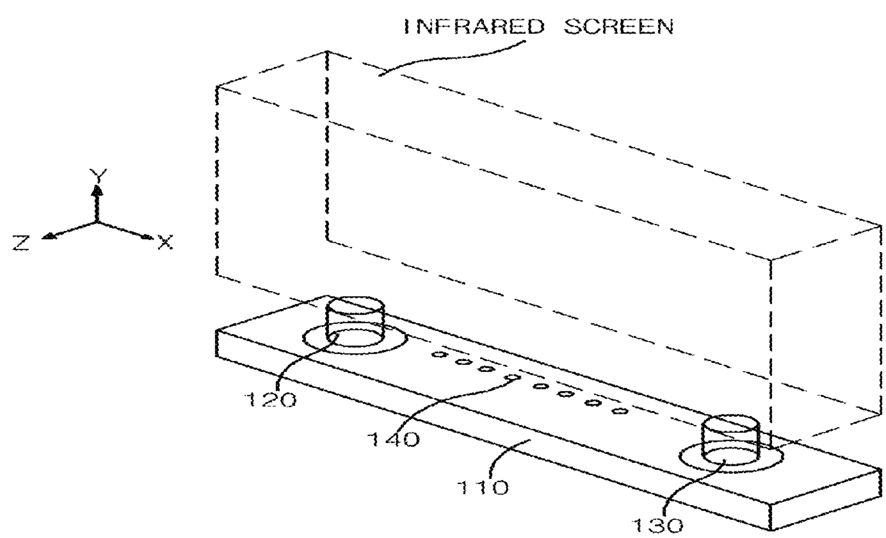
FIGS. 2 to 4 are diagrams of a 3D space touch apparatus according to an embodiment of the present invention.
Figure 3:
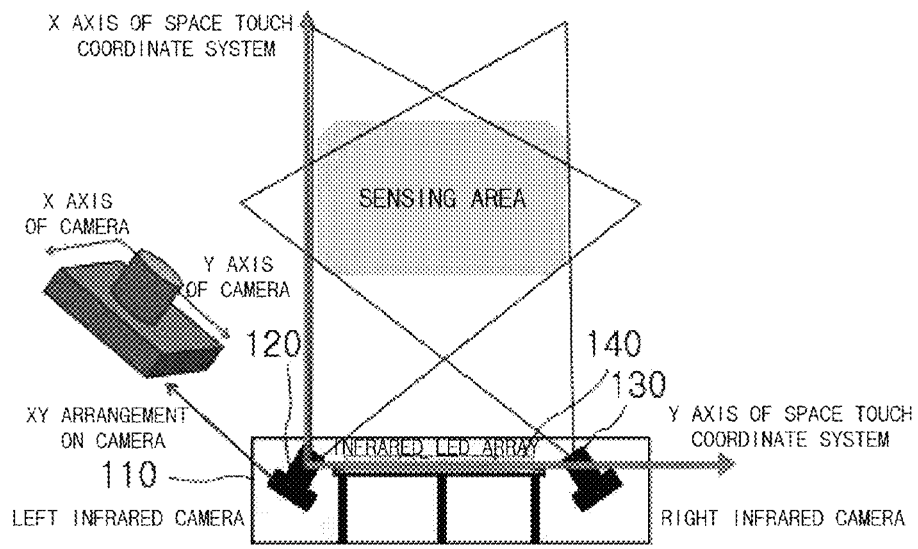
Figure 4:
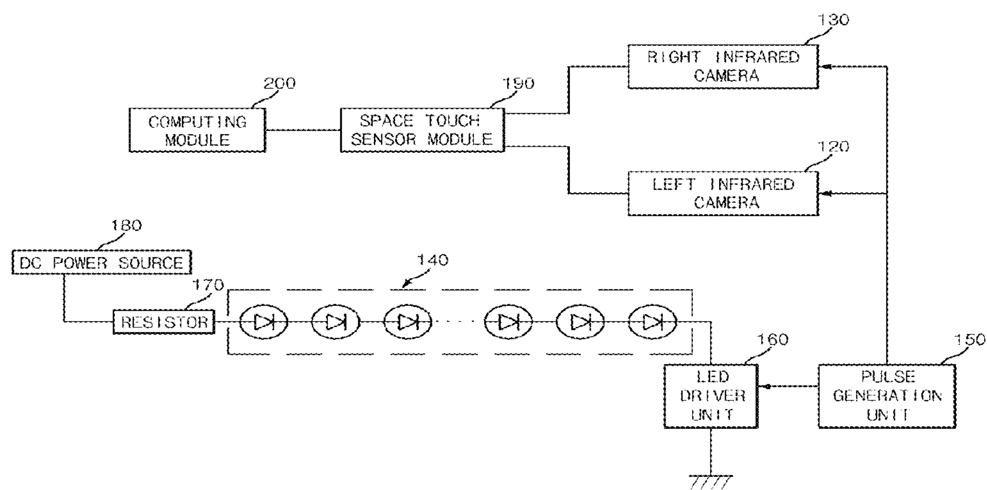

FIGS. 2 to 4 are diagrams of a 3D space touch apparatus according to an embodiment of the present invention.

As shown in FIGS. 2 to 4, the 3D space touch apparatus according to this embodiment of the present invention includes a support 110 for supporting an infrared LED array 140 and left and right infrared cameras 120 and 130, the infrared LED array 140 for emitting infrared rays, the left and right infrared cameras 120 and 130 for capturing an infrared screen, and a space touch sensor module 190 for calculating the X-axis, Y-axis and Z-axis coordinates of the location of the infrared screen touched by user pointing means (for example, a fingertip) using images captured by the left and right infrared cameras 120 and 130 and information about the resolutions and angles of view of the left and right infrared cameras 120 and 130.

The infrared screen is a virtual touch screen which is formed by the infrared LED array 140 in the space above the support 110.

The lateral length of the infrared screen is determined by the number of infrared LEDs arranged in a line.

The infrared LED array 110 is preferably implemented using narrow-angle infrared LEDs. In other words, it is preferable that the infrared beam angle of the infrared LED array 110 be 10° or less. Since such infrared LEDs are semiconductor devices which are widely used in the field of the art to which the present invention pertains, a detailed description thereof is omitted here.

As is well known to those skilled in the art, the left and right infrared cameras 120 and 130 include filters for cutting off the visible band and allowing only the infrared band to pass therethrough, and is configured to cut off visible rays generated by indoor fluorescent lamps or the like and capture only infrared rays in the form of a gray scale image.

Furthermore, the left and right infrared cameras 120 and 130 are installed on the left and right sides of the support 110 so that the lenses thereof can be oriented to the infrared screen.

As shown in FIG. 4, the 3D space touch apparatus according to this embodiment of the present invention may further include a pulse generation unit 150 for periodically generating a pulse signal, an LED driver unit 160 for driving the infrared LED array 140 in synchronization with an input pulse periodically input from the pulse generation unit 150, and a resistor 170 disposed between a Direct Current (DC) power source 180 and the infrared LED array 140.

In the above-described construction, the pulse generation unit 150 generates a pulse signal having, for example, a width of 100 μs per 10 ms.

In greater detail, the LED driver unit 160 supplies DC power to the infrared LED array 140 when a pulse signal is input from the pulse generation unit 150, and interrupts the supply of DC power to the infrared LED array 140 when a pulse signal is not input from the pulse generation unit 150.

That is, the LED driver unit 160 drives the infrared LED array 110 in response to the pulse signal without always turning on the infrared LED array 110. The reason for requiring pulse driving rather than constant current driving is as follows.

An LED is typically operated using a constant current driving method or a pulse driving method, and is brighter when being operated using the pulse driving method. That is, the pulse driving method allows higher current to flow into the LED than does the constant current driving method, and thus can produce brighter light. However, since the LED may be damaged by the pulse driving method, adjusting the time, that is, adjusting the pulse width, is required.

For example, when an LED is driven using a pulse, a current of 1 A can flow through the LED. In contrast, the LED is driven using a constant current, a current of 100 mA can flow into the LED. When the LED is operated using the pulse driving method rather than the constant current driving method in this way, brightness ten times that obtained by the constant current driving method can be obtained, and thus errors in the sensing of touches, which may be caused by external light (for example, sunlight, the light of a fluorescent lamp, or the light of an incandescent lamp), can be reduced.

Meanwhile, the left and right infrared cameras 120 and 130 capture images when a pulse signal is input from the pulse generation unit 150 as photos are taken when a camera flash is turned on.

Figure 5:
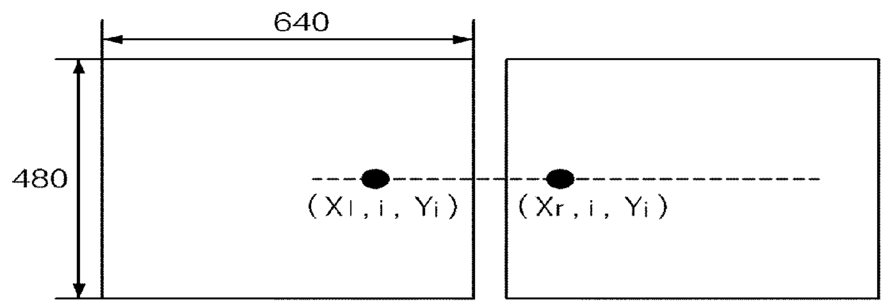
FIGS. 5 to 7 are diagrams illustrating the principle based on which 3D space touch is sensed according to the present invention.
Figure 6:
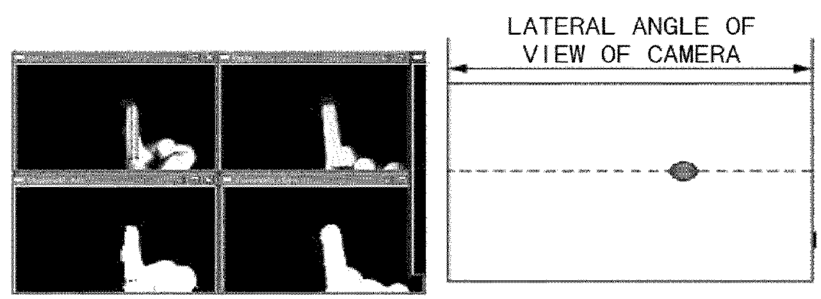
Figure 6:
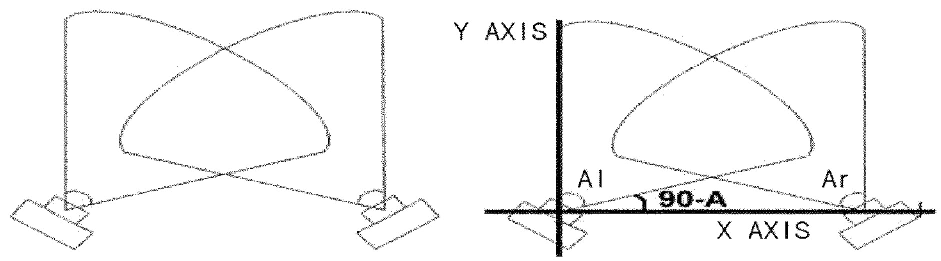
Figure 7:
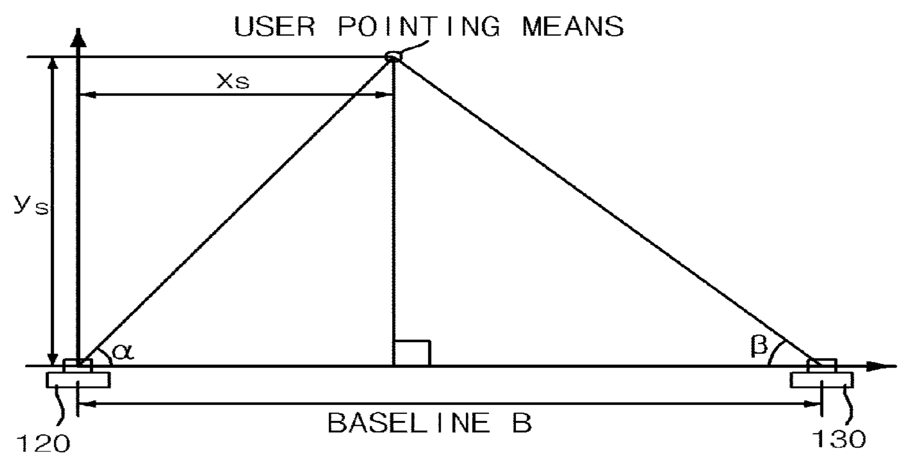

FIGS. 5 to 7 are diagrams showing the principle based on which a 3D space touch is sensed according to the present invention.

The images captured by the infrared cameras 120 and 130 are black because of infrared rays emitted from the infrared LED array 140 before the user's finger enters the infrared screen.

However, when the user's finger enters the infrared screen, the infrared rays become scattered (or diffused) on the infrared screen, and a portion in which the user's finger is located is seen to be bright. Consequently, when the tip of the user's finger is found by performing image processing on this bright portion, the $X_s$-, $Y_s$- and $Z_s$-axis coordinates of the location of the infrared screen touched by the user pointing means can be sensed.

The space touch sensor module 190 acquires the X, (lateral)- and Y, (vertical)-axis coordinates of the locations of camera images, touched by the user pointing means, by processing the camera images input from the left and right infrared cameras 120 and 130. Here, if two cameras are located on the same line and the angles of view, capture angle and resolution of the two cameras are the same, the vertical-axis coordinates of the locations of camera images touched by the user pointing means are the same for the two cameras, as shown in FIG. 5. In contrast, since the two cameras are located away from each other by a specific distance, the lateral-axis coordinates thereof cannot be the same if the user pointing means is not located between the two cameras.

The space touch sensor module 190 calculates the $Z_s$-axis coordinate of the location of the infrared screen, touched by the user pointing means, using the vertical-axis coordinate of the locations of the camera images touched by the user pointing means. The calculation method is simple. For example, when the resolution of the vertical axis is 480 and the vertical-axis coordinate is 200, the $Z_s$-axis coordinate is "200/480* (maximum Z-axis physical distance)." Here, the Z axis maximum physical distance is a predetermined constant, and the range of the $Z_s$-axis coordinates is determined by the value of this predetermined constant.

Furthermore, the space touch sensor module 190 calculates the $X_s$- and $Y_s$-axis coordinates of the corresponding location of the infrared screen using the lateral-axis coordinates of the locations of the camera images touched by the user pointing means and information about the resolution and angle of view of the left and right infrared cameras 120 and 130.

First, angles α and β are acquired (refer to FIG. 7). The acquisition method is expressed by the following Equation 1:

$$\alpha = \frac{640 - x_{l,i}}{640} A_l + (90 - A_l) \tag{1}$$

$$\beta = \frac{640 - x_{r,i}}{640} A_r + (90 - A_r)$$

In the above Equation 1, $x_{l,i}$ and $A_l$ are the lateral-axis coordinate and angle of view of the left camera, respectively (refer to FIG. 6). Furthermore, $x_{r,l}$ and $A_r$ are the lateral-axis coordinate and angle of view of the right camera, respectively (refer to FIG. 6).

The space touch sensor module 190 acquires the angles α and β using Equation 1, and calculates the $X_s$- and $Y_s$-axis coordinates of the corresponding location of the infrared screen using the following Equation 2 (refer to FIG. 7):

$$\frac{y}{x} = \tan(\alpha) \quad (2)$$

$$\frac{y}{B-x} = \tan(\beta)$$

$$\frac{x\tan(\alpha)}{B-x} = \tan(\beta)$$

$$x = \frac{B\tan(\beta)}{\tan(\alpha) - \tan(\beta)}$$

$$y = \frac{B\tan(\alpha)\tan(\beta)}{\tan(\alpha) + \tan(\beta)}$$

In the above Equation 2, x is the $X_s$-axis coordinate of the infrared screen, y is the $Y_s$-axis coordinate of the infrared screen, and B is the distance between the two cameras.

Figure 8:
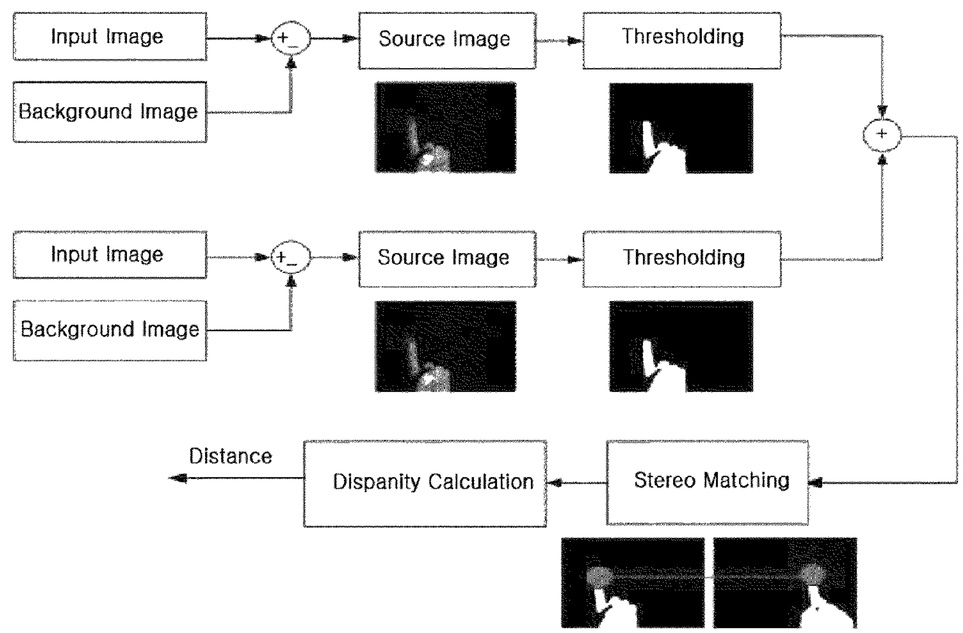
FIG. 8 is a flowchart illustrating a method of sensing the X, (lateral)- and Y, (vertical)-axis coordinates of the locations of camera images touched by user pointing means.

FIG. 8 is a flowchart illustrating a method of sensing the $X_i$ (lateral)- and $Y_i$ (vertical)-axis coordinates of the locations of camera images touched by the user pointing means.

The space touch sensor module 190 acquires a difference image (source image) by a subtraction operation of subtracting the pixel values of previously stored background images from the pixel values of camera images input from the left and right infrared cameras 120 and 130. Then, as shown in FIG. 8, a background region having the same pixel values for each camera image and a corresponding background image is made to have 0 values by the subtraction operation, thereby being blackened.

Thereafter, the space touch sensor module 190 eliminates noise by smoothing the difference image.

Thereafter, the space touch sensor module 190 acquires a binary image by performing a thresholding operation. That is, among the 0~255 numerical values of the smoothed difference image, data equal to or higher than a predetermined reference value is reset to 255, and data lower than the predetermined reference value is reset to 0, thereby acquiring a binary image which is represented in only black and white.

Thereafter, the space touch sensor module 190 sequentially searches the pixels of the left or right binary image from the uppermost pixel thereof along a lateral direction, and then senses the coordinate of a first white pixel. That is, this coordinate is the lateral- or vertical-axis coordinate of the location of the camera image touched by the fingertip (user pointing means), and is used to calculate the Xs-, Ys- and Zs-axis coordinates of the corresponding location of the infrared screen.

Figure 9:
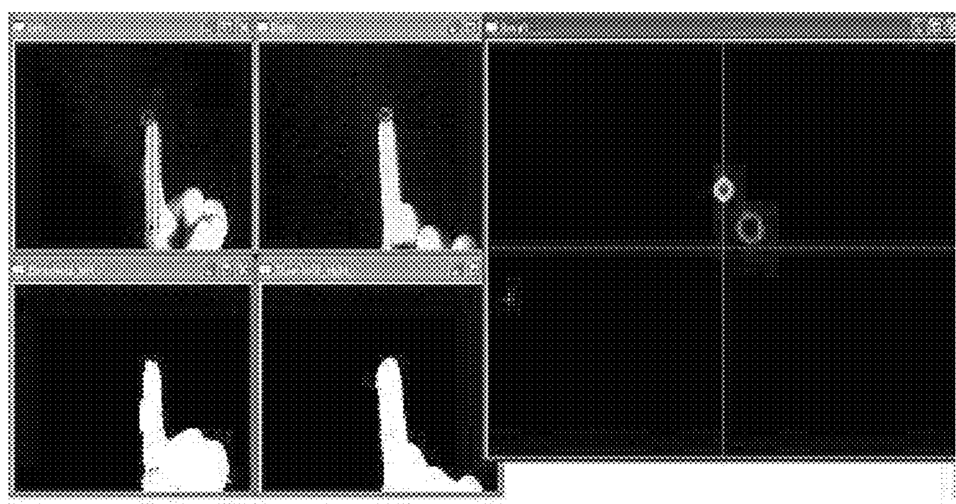
FIG. 9 is a diagram showing the $X_s$-, $Y_s$- and $Z_s$-axis coordinates of the location of the infrared screen touched by user pointing means (a fingertip).

FIG. 9 shows the $X_s$-, $Y_s$- and $Z_s$-axis coordinates of the location of the infrared screen touched by user pointing means (a fingertip).

As shown in FIG. 9, a large red circle indicates the $X_s$-axis and $Y_s$-axis coordinates of the fingertip, and a small green circle indicates the $Z_s$-axis coordinate thereof, that is, the touch depth. For example, when a user inserts the fingertip to the fore part of the infrared screen, the small green circle moves upwards. In contrast, when the user moves the fingertip to his or her body, the small green circle moves downwards. Meanwhile, when the fingertip is moved to the left, to the right, up or down, the large red circle moves accordingly.

Meanwhile, the 3D space touch apparatus according to this embodiment of the present invention may further include a computing module 200 which performs a function corresponding to 3D location information sensed by the space touch sensor module 190.

In greater detail, when the space touch sensor module 190 outputs 3D location information, the computing module 200 recognizes the 3D location information as the selection of a function, and performs the corresponding function. For example, when a user inserts a finger deep into the fore part of the infrared screen and then moves it to the left, it is recognized as a drag operation and then the corresponding function is performed.

Furthermore, the computing module 200 is connected to an external device over a wired or wireless network. If so, the external device can be controlled using 3D location information recognized by the space touch sensor module 190. In other words, if the 3D location information corresponds to a control command to control the external device, the external device is caused to perform the corresponding function. Here, the external device may be a home network household electronic appliance and a server which are connected via a network.

As described above, the 3D space touch apparatus according to the present invention is advantageous in that it can provide users with a more realistic, interactive user interface and can offer them pleasure and convenience. Therefore, kiosks to which the present invention is applied will be implemented using such a realistic user interface in the near future.

In particular, the 3D space touch apparatus according to the present invention can implement a variety of user interfaces compared with a conventional 2D touch apparatus by using the Z-axis coordinates of the infrared screen as depth information.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A three-dimensional (3D) space touch apparatus, comprising:

an infrared Light-Emitting Diode (LED) array;

left and right infrared cameras;

a support that supports the infrared LED array and the left and right infrared cameras, wherein the infrared LED array emits infrared rays to form an infrared screen having a predetermined shape in a space above the support, and wherein the left and right infrared cameras are disposed on left and right sides of the support so that lenses thereof can be oriented to the infrared screen; and a space touch sensor module that calculates X-axis, Y-axis and Z-axis coordinates of a selected location in the infrared screen, touched by user pointing means, using scattering or diffusion of the infrared rays generated in images including the selected location captured by the left and right infrared cameras when the selected location is touched by the user pointing means, wherein the space touch sensor module:

calculates the Z-axis coordinate of the selected location in the infrared screen by dividing a vertical-axis coordinate of locations, corresponding to the selected location of the camera images touched by the user pointing means, by a resolution of the left and right infrared cameras, and multiplying a result of the division by a predetermined distance of the Z-axis; and calculates the X-axis and Y-axis coordinates of the selected location in the infrared screen using lateral-axis coordinates of the locations in the camera images touched by the user pointing means and information about angles of view of the left and right infrared cameras.

2. The 3D space touch apparatus as set forth in claim 1, further comprising:

a pulse generation unit that periodically generates a pulse signal; and an LED driver unit coupled to the pulse generation unit, wherein the LED driver unit supplies pulsed Direct Current (DC) power to the infrared LED array.

3. The 3D space touch apparatus as set forth in claim 2, wherein the left and right infrared cameras perform capturing when the pulse signal is input from the pulse generation unit.

4. The 3D space touch apparatus as set forth in claim 1, wherein the space touch sensor module further uses a difference between a previously stored background image and the image including the selected location to calculate the X-axis and Y-axis coordinates of the selected location in the infrared screen.

5. The 3D space touch apparatus as set forth in claim 1, wherein the resolutions of the left and right infrared cameras indicate a maximum physical distance of the Z-axis.

6. A space touch apparatus, comprising:

at least one infrared light source which emits at least one infrared ray to form an infrared screen having a predetermined coordinate frame in a space;

at least two cameras oriented to the infrared screen to respectively capture at least two images of an area including a selected location, touched by user pointing means, in the infrared screen; and a space touch sensor module which calculates coordinates of the selected location in the infrared screen using scattering or diffusion of the infrared ray generated in the at least two images of the area including the selected location respectively captured by the at least two cameras when the selected location is touched by the user pointing means, wherein the space touch sensor module:

calculates a Z-axis coordinate of the selected location in the infrared screen by dividing a vertical-axis coordinate of locations, corresponding to the selected location of the camera images touched by the user pointing means, by a resolution of the at least two cameras, and multiplying a result of the division by a predetermined distance of the Z-axis; and calculates X-axis and Y-axis coordinates of the selected location in the infrared screen using lateral-axis coordinates of the locations of the camera images touched by the user pointing means and information about angles of view of the at least two cameras.

7. The space touch apparatus of claim 6, wherein the infrared screen has a three-dimensional (3D) shape, and the space touch sensor module calculates 3D coordinates of the selected location in the infrared screen using the at least two images of the area including the selected location respectively captured by the at least two cameras.

8. The space touch apparatus of claim 7, wherein the space touch sensor module calculates the 3D coordinates of the selected location in the infrared screen further using information about resolutions and angles of view of the at least two cameras.

9. The space touch apparatus of claim 6, wherein the infrared screen has a three-dimensional (3D) shape, and the space touch sensor module calculates 3D coordinates of the selected location in the infrared screen using the at least two images of the area including the selected location respectively captured by the at least two cameras.

10. The space touch apparatus of claim 9, wherein the space touch sensor module calculates the 3D coordinates of the selected location in the infrared screen further using information about resolutions and angles of view of the at least two cameras.

11. The space touch apparatus as set forth in claim 6, wherein the space touch sensor module further uses a difference between a previously stored background image and the at least two images including the selected location to calculate X-axis and Y-axis coordinates of the selected location in the infrared screen.

12. A space touch apparatus, comprising:

at least one light source which emits at least one selected wavelength light ray to form a screen having a predetermined shape in a space;

at least two cameras including a left and a right infrared camera which respectively capture at least two images of an area including a selected location using scattering or diffusion of the selected wavelength light rays when the selected location is touched by user pointing means in the screen, and filtering out different wavelength lights;

a space touch sensor module which calculates coordinates of the selected location in the infrared screen, touched by user pointing means, using the at least two images of the area including the selected location respectively captured by the at least two cameras, wherein the space touch sensor module:

calculates a Z-axis coordinate of the selected location in the screen by dividing a vertical-axis coordinate of locations, corresponding to the selected location of the camera images touched by the user pointing means, by a resolution of the left and right infrared cameras, and multiplying a result of the division by a predetermined distance of the Z-axis; and calculates X-axis and Y-axis coordinates of the selected location in the infrared screen using lateral-axis coordinates of the locations in the camera images touched by the user pointing means and the information about angles of view of the left and right infrared cameras.

13. The space touch apparatus of claim 12, wherein the screen has a three-dimensional (3D) shape, and the space touch sensor module calculates 3D coordinates of the selected location in the screen, touched by user pointing means, using the at least two images of the area including the selected location respectively captured by the at least two cameras.

14. The space touch apparatus of claim 13, wherein the space touch sensor module calculates the 3D coordinates of the selected location in the screen further using information about resolutions and angles of view of the at least two cameras.

15. The space touch apparatus of claim 12, wherein the screen has a three-dimensional (3D) shape, and the space touch sensor module calculates 3D coordinates of the selected location in the screen using the at least two images of the area including the selected location respectively captured by the at least two cameras.

16. The space touch apparatus of claim 15, wherein the space touch sensor module calculates the 3D coordinates of the selected location in the screen further using information about resolutions and angles of view of the at least two cameras.

17. The space touch apparatus as set forth in claim 12, wherein the space touch sensor module further uses a difference between a previously stored background image and the at least two images including the selected location to calculate X-axis and Y-axis coordinates of the selected location in the infrared screen.

18. The space touch apparatus as set forth in claim 12, wherein a number of the at least one light source is two or more, wherein a size of the screen is determined by the number of the at least one infrared light source, and wherein the screen is formed independently from fields of view of the at least two cameras and is not limited by a physical boundary to form the predetermined shape in the space.

19. The space touch apparatus as set forth in claim 12, wherein a number of the at least one light source is two or more, wherein a size of the screen is determined by the number of the at least one light source, and wherein the screen is formed independently from fields of view of the at least two cameras and is not limited by a physical boundary to form the predetermined shape in the space.

* * * * *